Patented June 15, 1954

UNITED STATES PATENT OFFICE 2,681,350

2,681,350

PROCESS FOR PREPARING THIENYL THIOLESTERS

Emil Koft, Jr., Woodbury Heights, and George C. Johnson, Woodbury, N. J., assignors to Socony-Vacuum Oil Company, Incorporated, a corporation of New York No Drawing. Application November 28, 1950, Serial No. 198,038

7 Claims. (Cl. 260—332.2)

This invention relates to a process for preparing thienyl thiolesters and more particularly is concerned with an improved procedure for synthesizing the thienyl thiolesters of aliphatic monocarboxylic acids.

The thienyl thiolesters produced by the method described herein may be characterized by the formula:

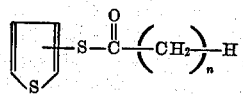

where $n$ is an integer of from 1 to 5. The process of this invention has been found to be particularly valuable in the preparation of thienyl thiolacetate.

Thienyl thiolesters have heretofore been prepared by reaction of an organic acid chloride with thiophenethiol under anhydrous conditions. Such procedure involves the evolution of undesirable hydrogen chloride, necessitates the use of comparatively expensive acid chlorides, and requires careful maintenance of anhydrous conditions during the course of reaction. In so far as is known, esterification of thiophenethiol with the less expensive carboxylic acid anhydrides has heretofore not been achieved.

In accordance with the present invention, it has been discovered that thienyl thiolesters of aliphatic monocarboxylic acids may be economically and conveniently synthesized by reaction of thiophenethiol with an anhydride of an aliphatic monocarboxylic acid at a temperature between about 20° C. and about 35° C. and in the presence of an aqueous solution of a water-soluble alkali metal compound, the concentration of which is sufficient to maintain the reaction mixture within a pH range of 6 to 8.

The present process is convenient in that high yields of the desired thienyl thiolester are obtained by conducting the reaction at substantially room temperature. It is surprising that the instant reaction can be effectively accomplished at said temperatures since the acid anhydrides utilized herein ordinarily rapidly hydrolyze in water at these temperatures to the corresponding acids which are unsuitable for the reaction. Thus, acetic anhydride brought into contact with water rapidly hydrolyzes at a temperature of about 25° C. so that after approximately 10 minutes the anhydride is about 80 per cent hydrolyzed, the rate of hydrolysis increasing rapidly with increasing temperature. The rate of hydrolysis of acetic anhydride together with the success in preparing high yields of thienyl thiolacetate indicate that the reaction between acetic anhydride and thiophenethiol occurs much more rapidly than the reaction between acetic anhydride and water. In light of previously known chemistry, it would have been expected that thiophenethiol in aqueous alkaline solution would react with acetic anhydride to form acetic acid, sodium acetate, and thiophenethiol, without formation of more than minor amounts of thienyl thiolacetate in accordance with the following equation:

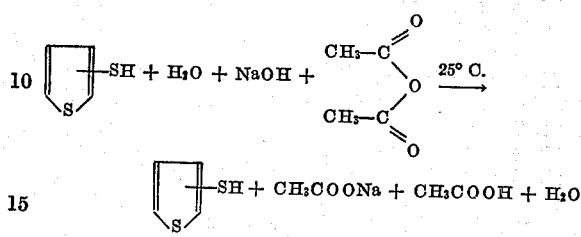

Instead of this expected reaction taking place, it has been unexpectedly found that an excellent yield of thienyl thiolacetate is obtained by esterification of thiophenethiol with acetic anhydride in aqueous alkaline solution at temperatures within the range of 20 to 35° C. The reaction of this invention accordingly appears to proceed in accordance with the following equation:

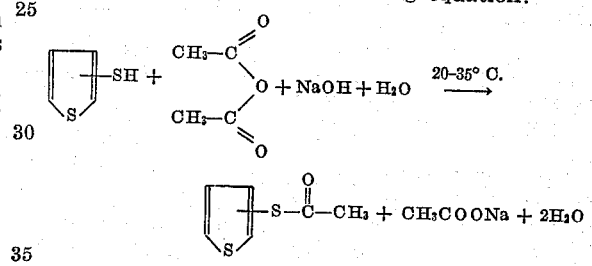

The thiophenethiol reactant employed in the present process may be either 2-thiophenethiol or 3-thiophenethiol. The reactant of thiophenethiol may be prepared by any one of numerous procedures heretofore described in the literature. Thus, 3-thiophenethiol may be produced by the process described in Chem. Inds. 60, 593–5, 620 (1947) and 2-thiophenethiol by the procedure described in Ber. Dtsch. Chem. Ges. 19, 1615 (1886) or in Ber. Dtsch. Chem. Ges. 20, 1756 (1887).

The carboxylic acid anhydride employed is an anhydride of an unsubstituted saturated aliphatic monocarboxylic acid, said acid containing from 2 to 6 carbon atoms. Typical of the acid anhydrides contemplated for use in the present reaction are acetic anhydride, propionic anhydride, crotonic anhydride, and the mixed anhydride of acetic and propionic acid. The method of this invention may be carried out with a molar ratio of thiophenethiol to acid anhydride of between about 1 to 1.5 and about 1 to 0.5. Ordinarily, however, it is preferred to react a substantially equi-molar ratio of thiophenethiol and acid anhydride.

The reaction is carried out in the presence of an aqueous solution of a water-soluble alkali metal compound, such as the hydroxides and carbonates of the alkali metals. In particular, use of an aqueous sodium hydroxide solution is preferred. The concentration and amount of aqueous solution of alkali metal compound present in the reaction mixture is such as to substantially neutralize the mixture so that the pH of the mixture during reaction is between about 6 and about 8. This is accomplished by adjusting the molar ratio of alkali metal compound to thiophenethiol contained in the initial reaction mixture to substantial unity.

An important feature of the method of this invention is that it is carried out at a temperature between about 20° C. and about 35° C., which is within the range of ordinary room temperature. The use of such temperatures has been found to afford an economical and convenient process for obtaining a high yield of thienyl thiolesters, which find use as oil addition agents and as intermediates in the synthesis of pharmaceutical and dye compounds.

The following specific, but non-limiting example, will serve to illustrate the method of this invention:

Twenty parts by weight of sodium hydroxide and 40 parts by weight of water were mixed in a reaction vessel fitted with a thermometer and a mechanical stirrer. Fifty-eight parts by weight of 3-thiophenethiol was added with agitation while the temperature was maintained at 25–30° C. A clear, orange-red solution resulted. With vigorous agitation, 53 parts by weight of acetic anhydride (97–98%) was gradually added over a period of 5 minutes. The temperature of the reaction mixture was kept at 20–35° C. After the addition of the acetic anhydride, agitation was continued for 10 minutes at a temperature within the above range.

The reaction mixture was then diluted with water to separate an oily layer. This organic layer was taken up in ethyl ether, water-washed, and then dried over anhydrous sodium sulfate. After filtering off the drying agent and distilling off the ethyl ether, the residue solidified into a tan crystalline mass of crude 3-thienyl thiolacetate. The yield of crude product was 76 parts by weight, representing a yield of 96.2 per cent. A sample recrystallized from n-hexane melted at 42–43° C. A mixed melting point with a known sample of pure 3-thienyl thiolacetate gave no depression. The recrystallized product accordingly was confirmed as substantially pure 3-thienyl thiolacetate.

While the foregoing example has been directed specifically to the preparation of 3-thienyl thiolacetate, it will be understood that the method of this invention may likewise be employed in the synthesis of other thienyl thiolesters as set forth hereinabove. Accordingly, the above description is merely illustrative of preferred embodiments of the invention, of which many variations may be made within the scope of the following claims by those skilled in the art without departing from the spirit thereof.

We claim:

1. A method for preparing a thienyl thiolester having the formula:

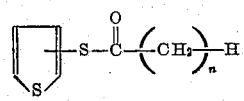

where $n$ is an integer of from 1 to 5, which comprises the reaction, in the absence of a catalyst, of an anhydride of an unsubstituted saturated aliphatic monocarboxylic acid, said acid containing from 2 to 6 carbon atoms and an aqueous solution of an alkali metal salt of thiophenethiol under substantially neutral conditions and at a temperature between about 20° C. and about 35° C.

2. A method for preparing a thienyl thiolester having the formula:

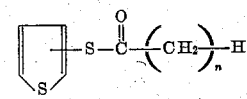

where $n$ is an integer of from 1 to 5, which comprises reacting, in the absence of a catalyst, an anhydride of an unsubstituted saturated fatty acid, said acid containing from 2 to 6 carbon atoms at a temperature between about 20° C. and about 35° C. with an aqueous solution of a water-soluble alkali metal compound and thiophenethiol, the concentration of alkali metal compound in said solution being sufficient to substantially neutralize the thiophenethiol reactant.

3. A method for preparing thienyl thiolacetate, which comprises the reaction, in the absence of a catalyst, of acetic anhydride and an aqueous solution of an alkali metal salt of thiophenethiol, said reaction being conducted under pH conditions in the range of 6 to 8 and at a temperature between about 20° C. and about 35° C.

4. A method for preparing thienyl thiolacetate, which comprises reacting, in the absence of a catalyst and at a temperature between about 20° C. and about 35° C. acetic anhydride and an aqueous solution of a water-soluble alkali metal compound and thiophenethiol, the concentration of said alkali metal compound in said solution being sufficient to substantially neutralize the thiophenethiol reactant.

5. A method for preparing 3-thienyl thiolacetate, which comprises reacting, in the absence of a catalyst and at a temperature between about 20° C. and about 35° C., acetic anhydride and an aqueous solution of a water-soluble alkali metal compound and 3-thiophenethiol, the concentration of said alkali metal compound in said solution being sufficient to substantially neutralize the thiophenethiol reactant.

6. A method for preparing 3-thienyl thiolacetate, which comprises reacting, in the absence of a catalyst, acetic anhydride and an aqueous solution of an alkali metal salt of 3-thiophenethiol under substantially neutral conditions and at a temperature between about 20° C. and about 35° C.

7. A method for preparing 3-thienyl thiolacetate, which comprises reacting, in the absence of a catalyst, acetic anhydride at a temperature between about 20° C. and about 35° C., with an aqueous sodium hydroxide solution of 3-thiophenethiol, said solution containing substantially equi-molar amounts of 3-thiophenethiol and sodium hydroxide.

References Cited in the file of this patent

UNITED STATES PATENTS

| Number | Name | Date |
| --- | --- | --- |
| 2,259,869 | Allen | Oct. 21, 1941 |
| 2,445,142 | Himel | July 13, 1948 |
| 2,540,093 | Brooks | Feb. 6, 1951 |
| 2,581,626 | Brooks | Jan. 8, 1952 |